United States Patent
Shozo (10) Patent No.: US 6,911,626 B2
(45) Date of Patent: Jun. 28, 2005

(54) OVERHEATED STEAM OVEN

(75) Inventor: Kobayashi Shozo, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/829,339

(22) Filed: Apr. 22, 2004

(65) Prior Publication Data

US 2005/0051531 A1 Mar. 10, 2005

(30) Foreign Application Priority Data

Sep. 9, 2003 (KR) .......................................... 2003-63009

(51) Int. Cl.$^7$ ................................................ A21B 1/08
(52) U.S. Cl. ...................... 219/401; 219/402; 219/408; 219/400; 99/330; 99/332; 99/340; 126/20; 126/348; 126/369
(58) Field of Search ................................. 219/401, 400, 219/411, 402, 408, 410; 126/20, 348, 369, 401; 392/394, 403, 405; 99/330, 332, 340

(56) References Cited

U.S. PATENT DOCUMENTS 3,639,725 A * 2/1972 Maniscalo .................. 219/401
5,158,064 A * 10/1992 Willis et al. .................. 126/20

OTHER PUBLICATIONS

T. Junzo et al., Steam Cooking, 5–256455 Patent Abstracts of Japan, May 10, 1993, 1 page.

* cited by examiner

*Primary Examiner*—Shawntina Fuqua
(74) *Attorney, Agent, or Firm*—Staas & Halsey LLP (57) ABSTRACT

An overheated steam oven including a cabinet to define a cooking cavity therein, and an overheated steam generator to supply overheated steam into the cooking cavity. The overheated steam generator includes a steam generating vessel of which an outlet is connected to and communicates with the cooking cavity, with a predetermined amount of water contained in the steam generating vessel. A first heater is installed in the steam generating vessel to be immersed in the water contained in the steam generating vessel so as to generate steam, and a second heater is mounted to an upper portion in the steam generating vessel so as to overheat the steam generated by the first heater.

22 Claims, 5 Drawing Sheets

OVERHEATED STEAM OVEN

CROSS-REFERENCE TO RELATED APPLICATIONS

This application claims the benefit of Korean Patent Application No. 2003-63009, filed Sep. 9, 2003 in the Korean Intellectual Property Office, the disclosures of which are incorporated herein by reference.

BACKGROUND OF THE INVENTION

1. Field of the Invention

The present invention relates, in general, to overheated steam ovens and, more particularly, to an overheated steam oven which is designed for home use by simplifying a construction and reducing a size of the overheated steam oven.

2. Description of the Related Art

Generally, to cook foods, the foods may be roasted by heat, such as in a gas oven, the foods may be steamed by vapor, such as in a steaming vessel, or the foods may be boiled with water, such as in a cooking vessel. Also, there are methods to cook foods using microwaves, far infrared rays, and overheated steam, etc.

Cooking while using gas ovens may, relatively evenly, heat foods in the gas oven, but it is problematic in that a taste of the foods reduces due to oxidation of the foods which results from contact with oxygen in air. Cooking using vapor needs plenty of water, and the foods may be insipid because some water is absorbed into the foods during cooking. Cooking using the cooking vessels have a problem in that the foods may be burnt by overly heating a part of the foods. For cooking using microwaves or far infrared rays, the foods must be rotated due to fixed radiating directions of the microwaves or the far infrared rays, and controlling the temperature of the food is difficult. Further, the foods may easily dry during cooking. To summarize, to appropriately cook foods, cooking apparatuses must evenly heat the foods at suitable temperatures, however, using the above-mentioned conventional cooking methods, it is difficult to satisfy cooking conditions.

Cooking using overheated steam is a method in that overheated steam is discharged into a cooking cavity. Since cooking using overheated steam evenly heats foods, the foods may not be partially burnt, and a cooking temperature is easily controlled by controlling a volume of the discharged overheated steam. Also, since oxidation of foods does not occur, cooking using the overheated steam has an advantage in that cooked foods have a better taste.

However, conventional cooking apparatuses using the overheated steam include a cooking cavity to contain foods therein, a steam boiler to generate the overheated steam, a water tank to supply water into the steam boiler, and a plurality of steam pipes to discharge the overheated steam generated by the steam boiler into the cooking cavity. Hence, cooking apparatuses are complex and costly. Accordingly, the conventional cooking apparatuses using overheated steam are both difficult to use at home and in a wide open establishment, as in a large restaurant for business. Also, in the conventional overheated steam cooking apparatuses, the overheated steam generated by the steam boiler is discharged into the cooking cavity through the steam pipes, resulting in increased heat loss.

SUMMARY OF THE INVENTION

Accordingly, it is an aspect of the present invention to provide an overheated steam oven which is designed for home use by simplifying a construction and reducing a size of the overheated steam oven.

It is another aspect of the present invention to provide an overheated steam oven which minimizes energy loss by effectively reducing heat loss due to an insulating construction thereof.

Additional aspects and/or advantages of the invention will be set forth in part in the description which follows and, in part, will be obvious from the description, or may be learned by practice of the invention.

The above and/or other aspects are achieved by providing an overheated steam oven, having a cabinet with a cooking cavity therein, and an overheated steam generator to supply overheated steam into the cooking cavity. The overheated steam generator includes a steam generating vessel, of which an outlet is connected to and communicates with the cooking cavity, with a predetermined amount of water contained in the steam generating vessel, a first heater which is installed in the steam generating vessel to be immersed in the water contained in the steam generating vessel to generate steam, and a second heater mounted to an upper portion in the steam generating vessel to overheat the steam generated by the first heater.

The steam generating vessel may be an insulating vessel.

The steam generating vessel may include an inner vessel part which contains the first heater and the second heater therein, and an outer vessel part which surrounds an outer surface of the inner vessel part while being spaced apart from the outer surface of the inner vessel part, with a space between the inner vessel part and the outer vessel part being maintained in a vacuum state.

A shielding material may fill the space between the inner vessel part and the outer vessel part to intercept radiant heat.

The first heater and the second heater each may have a spiral shape.

The first heater and the second heater may be supported by a lower plate which closes a lower end of the steam generating vessel.

A feed pipe and a drain pipe may be respectively coupled to the steam generating vessel to feed and drain water into and from the steam generating vessel.

A water level sensor may be installed in the steam generating vessel to monitor a level of the water contained in the steam generating vessel.

The steam generating vessel may include a bent part which is formed by bending an upper end of the steam generating vessel toward a rear wall of the cooking cavity, the bent part being connected at a front end thereof to a steam inlet port provided on the rear wall of the cooking cavity.

An exhaust path may be provided at an upper portion in the cooking cavity to discharge the steam from the cooking cavity to an outside of the cooking cavity.

Each of the walls of the cooking cavity may include a multi-layered panel that includes a plurality of sheets spaced apart from each other to insulate the cooking cavity.

The above and/or other aspects are achieved by providing an overheated steam oven, having a cabinet to define a cooking cavity therein, and an overheated steam generator to supply overheated steam into the cooking cavity. The overheated steam generator includes a steam generating vessel of which an outlet communicates with the cooking cavity, and containing a predetermined amount of water therein, a first heater installed under a lower end of the steam generating vessel to boil the water contained in the steam generating vessel, thus generating steam, and a second heater mounted to an upper portion in the steam generating vessel to overheat steam generated by the first heater.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
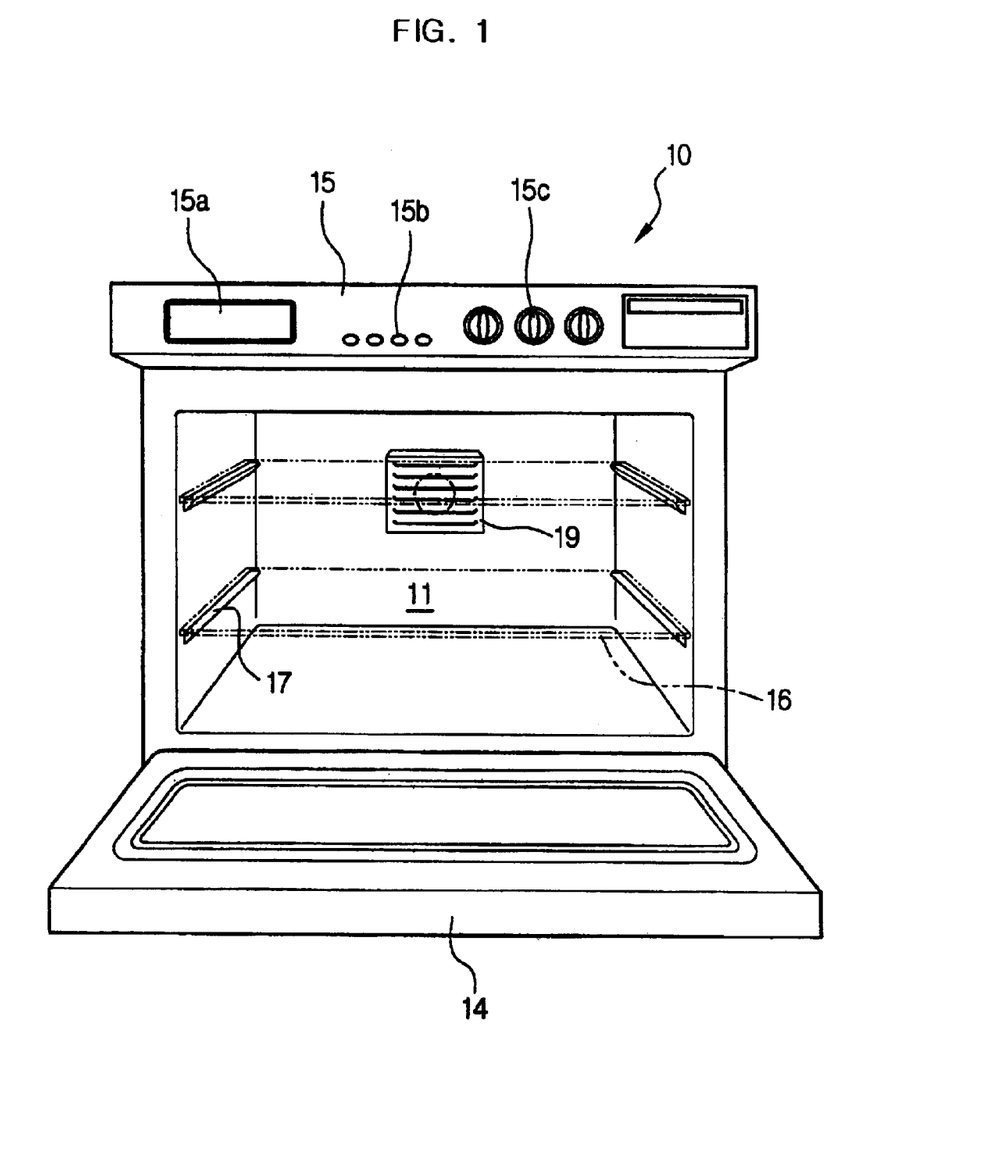
FIG. 1 is a perspective view of an overheated steam oven, according to a first embodiment of the present invention.
Figure 2:
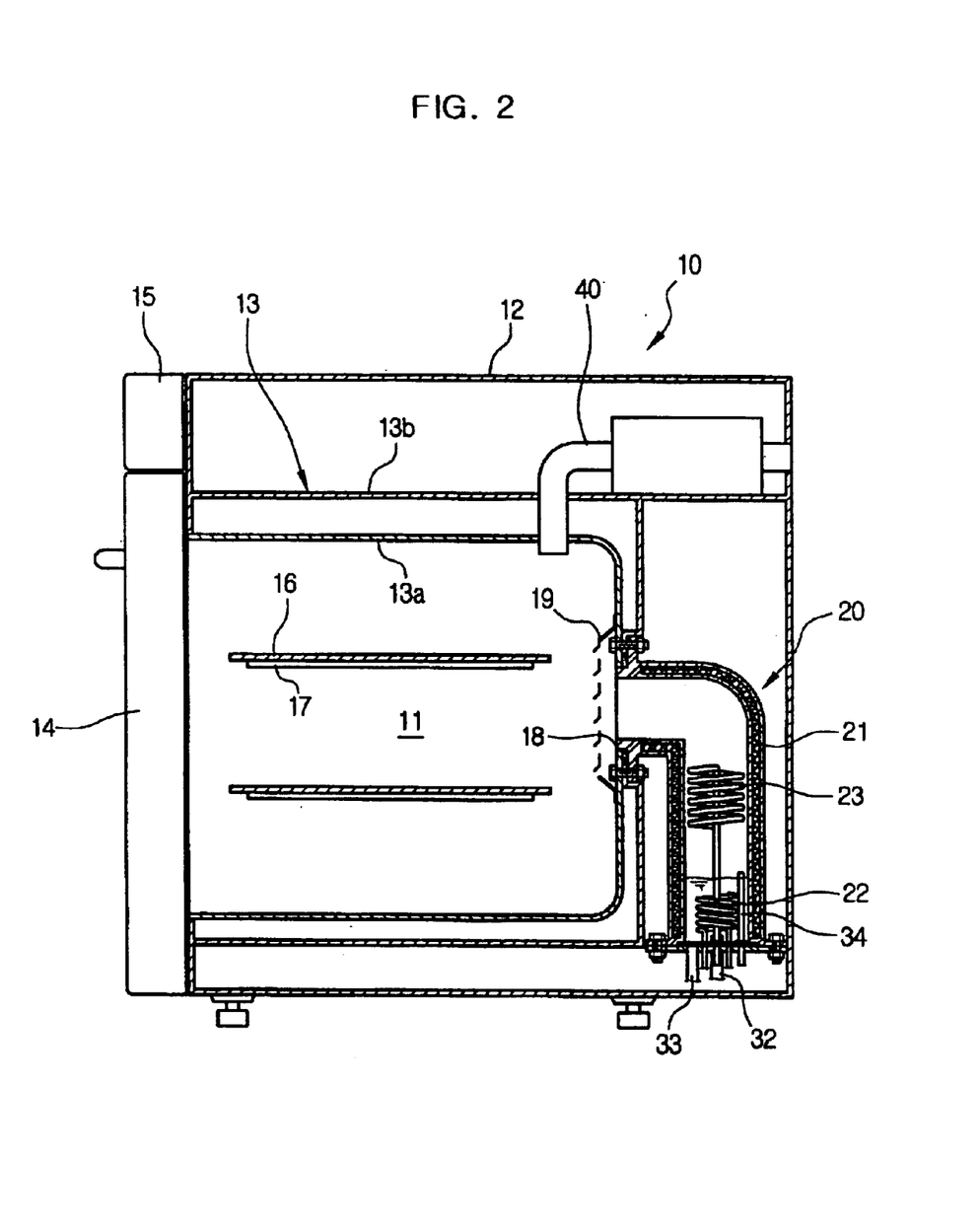
FIG. 2 is a sectional view illustrating an internal construction of the overheated steam oven of FIG. 1.

As shown in FIGS. 1 and 2, an overheated steam oven according to the first embodiment of the present invention includes a cabinet 10 to define a cooking cavity 11 therein, and an overheated steam generator 20 which is mounted to a rear wall in the cabinet 10 to supply overheated steam into the cooking cavity 11.

The cabinet 10 includes an outer casing 12, and an inner casing 13 which is installed in the outer casing 12 to be spaced apart from the outer casing 12, thus defining the cooking cavity 11 therein. The cooking cavity 11 is open at a front thereof so as to place and remove foods into and from the cooking cavity 11. Also, the inner casing 13 includes a first casing 13a and a second casing 13b which are spaced apart from each other so as to insulate the cooking cavity 11 from an outside of the cooking cavity 11. That is, each of walls of the cooking cavity 11 includes a multi-layered panel that has a plurality of sheets spaced apart from each other.

A door 14, which is opened downward and closed upward, is attached to the open front of the cabinet 10 so as to allow a user to open and close the cooking cavity 11. A control unit 15, which includes a display 15a to display an operational state of the overheated steam oven thereon, various kinds of control buttons 15b, and control switches 15c, are provided at a portion of the cabinet 10 above the door 14.

Upper and lower racks 16 are provided at upper and lower portions in the cooking cavity 11 to respectively support foods. Each of the upper and lower racks 16 is removably installed in the cooking cavity 11 to slide in a drawer-type movement along guide rails 17 which are oppositely formed on inner surfaces of both side walls of the inner casing 13.

Figure 3:
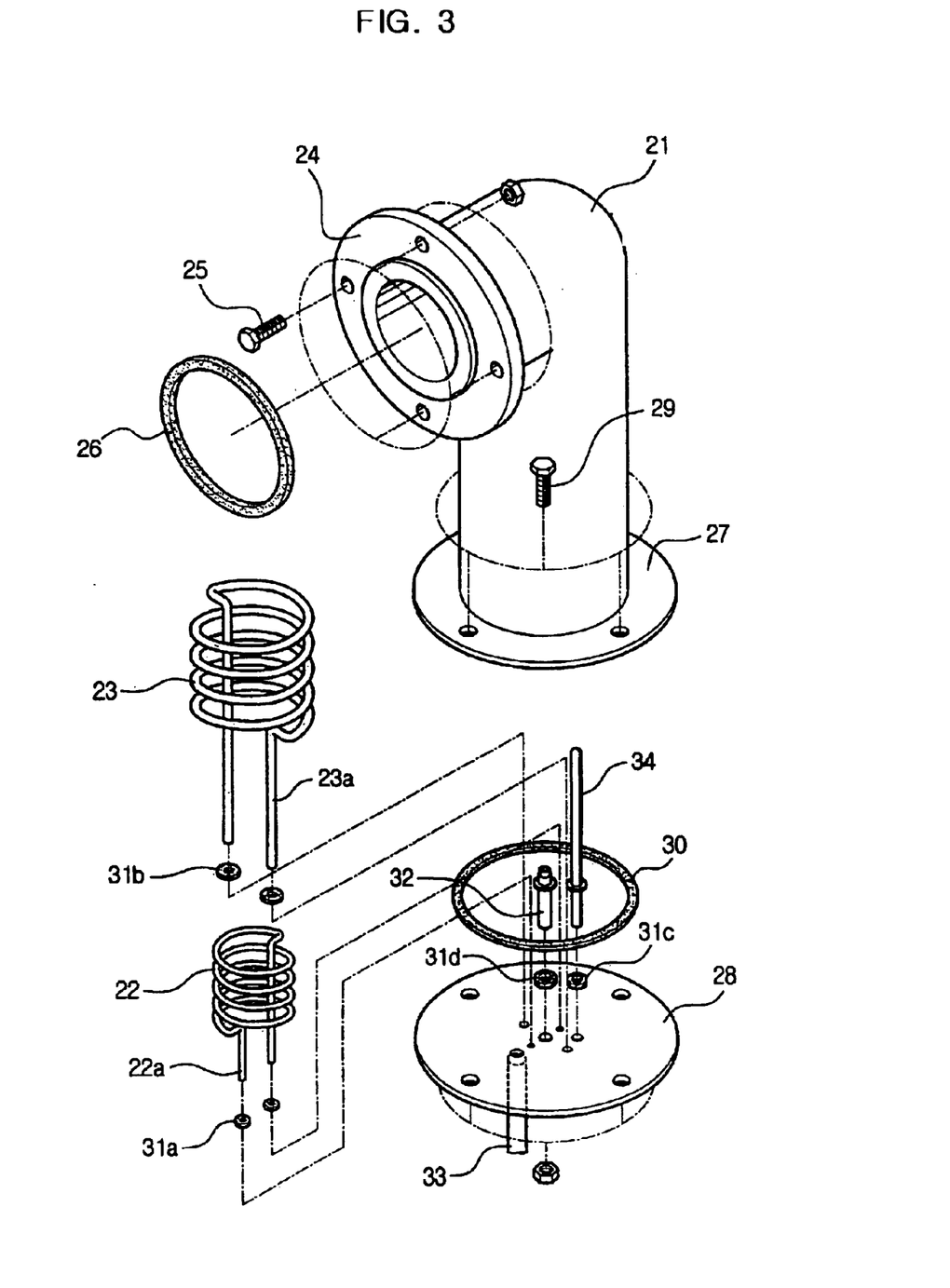
FIG. 3 is an exploded perspective view illustrating a construction of an overheated steam generator of the overheated steam oven of FIG. 2.

As shown in FIGS. 2 and 3, the overheated steam generator 20, which is provided on the rear wall of the cooking cavity 11, includes a steam generating vessel 21 of which an outlet is connected to a steam inlet port 18 provided on the rear wall of the cooking cavity 11, with a predetermined amount of water contained in the steam generating vessel 21. The overheated steam generator further includes a first heater 22 which is mounted to a lower portion in the steam generating vessel 21, and a second heater 23 which is mounted to an upper portion in the steam generating vessel 21.

Figure 4:
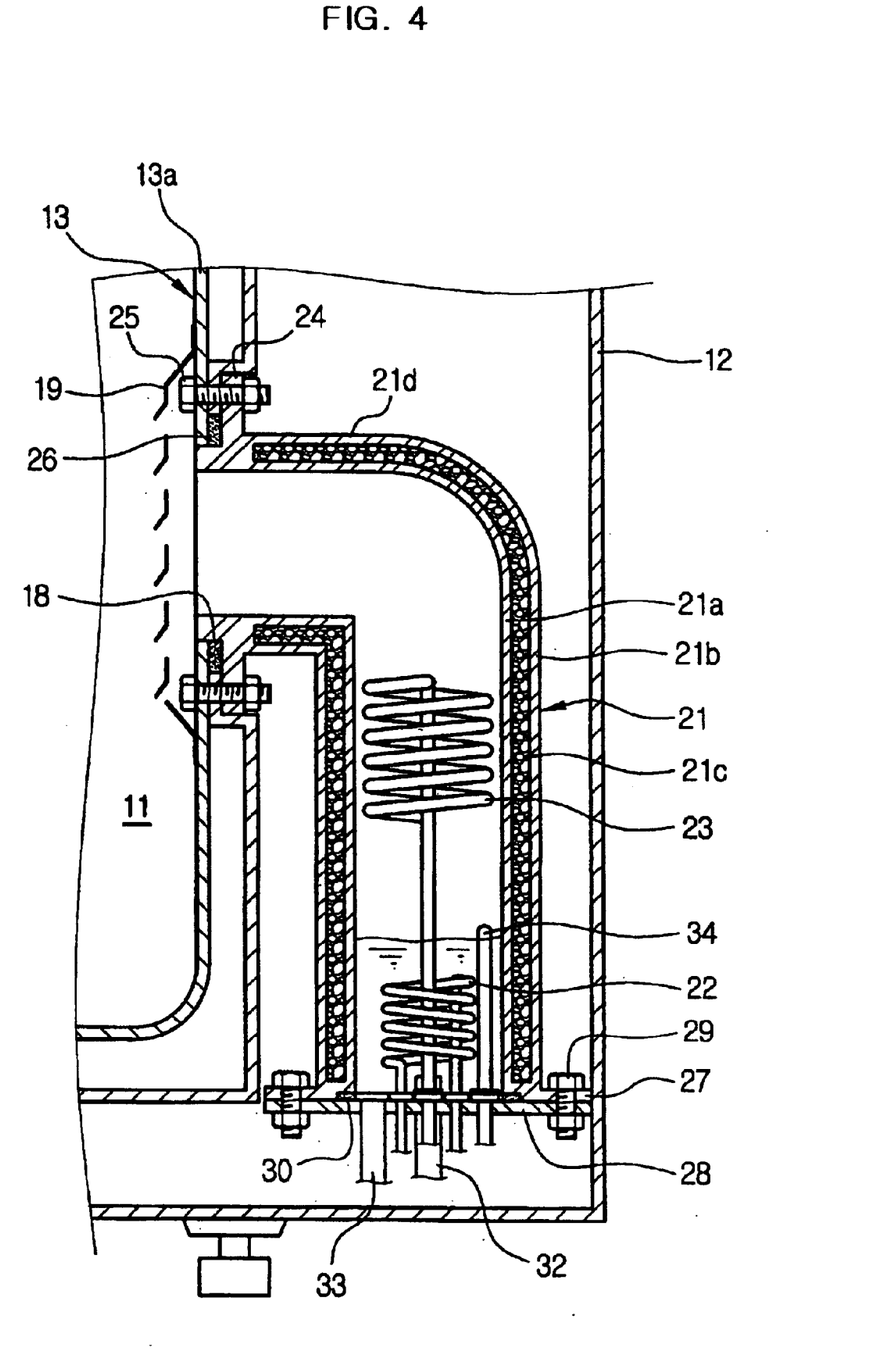
FIG. 4 is a sectional view illustrating the construction of the overheated steam generator of the overheated steam oven of FIG. 2.

As shown in FIGS. 3 and 4, the steam generating vessel 21 is a vacuum insulating vessel so that a space therein is insulated from an outside thereof, thus minimizing heat loss. The steam generating vessel 21 includes an inner vessel part 21a, and an outer vessel part 21b which surrounds an outer surface of the inner vessel part 21a while being spaced apart from the outer surface of the inner vessel part 21a. A shielding material 21c fills a space between the inner vessel part 21a and the outer vessel part 21b to intercept radiant heat. The space between the inner vessel part 21a and the outer vessel part 21b is sealed in a vacuum state, once the vacuum state is induced.

The steam generating vessel 21 further includes a bent part 21d which is formed by bending an upper end of the steam generating vessel 21 toward the rear wall of the cooking cavity 11. A front end of the bent part 21d, which is the outlet of the steam generating vessel 21, is connected to the steam inlet port 18 provided on the rear wall of the cooking cavity 11. At this time, an upper flange 24, which is provided around the outlet of the steam generating vessel 21, is mounted to a predetermined portion of the inner casing 13 around the steam inlet port 18 by a plurality of locking members 25, with a first packing 26 interposed between the upper flange 24 and the inner casing 13 to prevent the leakage of steam. A cover 19, on which a plurality of steam discharging holes are formed, is mounted to an inner surface of the rear wall of the cooking cavity 11 to allow the overheated steam generated by the overheated steam generator 20 to pass into the cooking cavity 11.

A lower flange 27 is provided at a lower end of the steam generating vessel 21. A lower plate 28, which closes an opening of the lower end of the steam generating vessel 21, is mounted to the lower flange 27 by a plurality of locking members 29. At this time, a second packing 30 is interposed between the lower plate 28 and the lower flange 27 to prevent the leakage of water from the steam generating vessel 21.

The first heater 22, which is mounted to the lower portion in the steam generating vessel 21, and the second heater 23, which is mounted to the upper portion in the steam generating vessel 21, each has a spiral shape to maximize a heat transferring surface area. First and second terminals 22a and 23a, which are respectively provided at the first and second heaters 22 and 23, are extended downward, and are supported by the lower plate 28. Accordingly, the first and second heaters 22 and 23 are supported on the lower plate 28. Also, third and fourth packings 31a and 31b are respectively interposed between the first and second terminals 22a and 23a of the first and second heaters 22 and 23 and the lower plate 28 to prevent the leakage of water from the steam generating vessel 21. When the predetermined amount of water is fed into the steam generating vessel 21, the first heater 22, which is provided at the lower portion of the steam generating vessel 21, is immersed in the water contained in the steam generating vessel 21, and the second heater 23, which is provided at the upper portion of the steam generating vessel 21, is placed above the water, which is contained in the steam generating vessel 21 and reaches a maximum water level. Due to the above-mentioned construction, the overheated steam is generated by allowing the second heater 23 to further heat the steam generated by an operation of the first heater 22 while the steam rises toward the outlet of the steam generating vessel 21.

Also, a feed pipe 32, to feed water into the steam generating vessel 21, a drain pipe 33, to drain the water from the steam generating vessel 21, and a water level sensor 34, to monitor a level of the water contained in the steam generating vessel 21, are respectively mounted to the lower plate 28 of the steam generating vessel 21. A fifth packing 31d is provided between the feed pipe 32 and the lower plate 28 to prevent the leakage of water from the steam generating vessel 21. A sixth packing 31c is provided between the water level sensor 34 and the lower plate 28 to prevent the leakage of water from the steam generating vessel 21. At this time, the feed pipe 32 is connected to an external water source (not shown). The water level of the water contained in the steam generating vessel 21 is maintained by controlling the amount of the water supplied from the water source (not shown) in response to a monitoring operation of the water level sensor 34. Also, a control valve (not shown) is provided on the drain pipe 33 to drain the residual water from the steam generating vessel 21 after a cooking operation.

As shown in FIG. 2, the overheated steam oven of the present invention further includes an exhaust duct 40 at an upper portion in the cooking cavity 11 to discharge the overheated steam from the cooking cavity 11 to an outside of the cooking cavity 11.

The operation of the overheated steam oven of the present invention will be described hereinbelow.

First, foods are placed on the upper and lower racks 16 of the cooking cavity 11. After, the overheated steam oven is operated and the water is fed into the steam generating vessel 21 through the feed pipe 32 of the overheated steam generator 20. At this time, the water level in the steam generating vessel 21 is controlled in response to the monitoring operation of the water level sensor 34. After a predetermined amount of water is fed into the steam generating vessel 21, the water contained in the steam generating vessel 21 is heated by the first heater 22 to generate steam. The steam is then generated by boiling the water contained in the lower portion of the steam generating vessel 21 by using the first heater 22 which is immersed in the water. Overheated steam is generated by further heating the steam using the second heater 23 while the steam rises in the steam generating vessel 21. The overheated steam is supplied into the cooking cavity 11 through the outlet of the steam generating vessel 21. The foods in the cooking cavity 11 are cooked by the heat of the overheated steam. After cooking is finished, the overheated steam is discharged to the outside of the cooking cavity 11 through the exhaust duct 40 provided at the upper portion of the cooking cavity 11.

In the above-mentioned operation, since the steam generating vessel 21 has an insulating construction and the outlet of the steam generating vessel 21 is mounted to the rear wall of the cooking cavity 11, the overheated steam oven of the present invention generates overheated steam while minimizing heat loss. In addition, since the overheated steam oven of the present invention rapidly supplies overheated steam into the cooking cavity 11, the energy loss is further minimized. Also, since the first heater 22, which has a spiral shape, is immersed in the water contained in the steam generating vessel 21, the overheated steam oven of the present invention may rapidly boil the water in the steam generating vessel 21. Also, since the second heater 23, which has a spiral shape, further heats the steam, the overheated steam oven of the present invention generates the overheated steam within a short period of time while reducing energy requirements.

Figure 5:
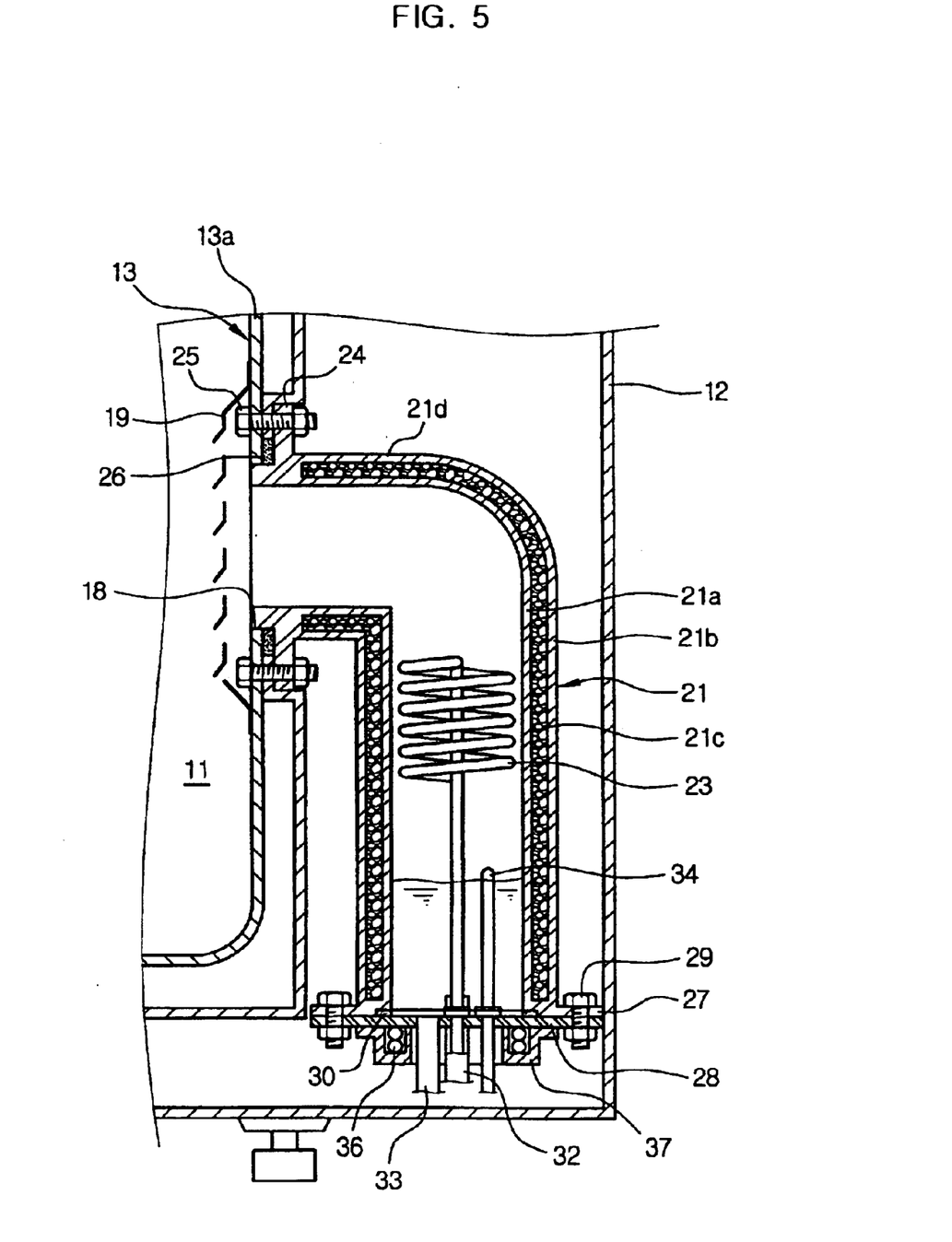
FIG. 5 is a sectional view illustrating a construction of an overheated steam generator of an overheated steam oven, according to a second embodiment of the present invention.

FIG. 5 is a sectional view showing a construction of an overheated steam generator 20 of an overheated steam oven, according to a second embodiment of the present invention. As shown in FIG. 5, a first heater 36 to generate steam in an overheated steam vessel 21 is installed under a lower end of the steam generating vessel 21. In the second embodiment of the present invention, the first heater 36 is embedded in a heat transfer unit 37 which is made of a metal. The heat transfer unit 37 having the first heater 36 is mounted to a lower surface of a lower plate 28 of the steam generating vessel 21. In the construction of the overheated steam oven as described above, since the first heater 36 heats the lower plate 28, the water contained in the steam generating vessel 21 is heated, hence, the steam is generated in the steam generating vessel 21. The general construction of the overheated steam oven according to the second embodiment expect for the above-mentioned structure remains the same as the first embodiment, and further explanation is thus not deemed necessary.

As is apparent from the above description, in an overheated steam oven of the present invention, since an overheated steam generator is mounted on a rear wall of a cooking cavity and the construction of the overheated steam generator is simple in comparison with steam boilers of conventional overheated steam cooking apparatuses etc., the present invention may be simply manufactured at a reduced cost. In addition, the overheated steam oven of the present invention may be used at home due to the simplified construction and the reduced size of the overheated steam oven.

Also, since a steam generating vessel of the overheated steam generator has an insulating construction, the overheated steam oven of the present invention generates overheated steam while minimizing heat loss. Since an outlet of the steam generating vessel is directly connected to the rear wall of the cooking cavity, the overheated steam oven of the present invention rapidly supplies the overheated steam into the cooking cavity.

Also, since each of walls of the cooking cavity includes a multi-layered panel that has a plurality of sheets spaced apart from each other, the overheated steam oven of the present invention further minimizes heat loss.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An overheated steam oven, having a cabinet to define a cooking cavity therein and an overheated steam generator to supply overheated steam into the cooking cavity, comprising:

a steam generating vessel having a predetermined amount of water contained therein;

an outlet, connected to the steam generating vessel, to communicate with the cooking cavity; and first and second heaters to produce steam from the water contained in the steam generating vessel, and to overheat the produced steam wherein the steam generating vessel comprises:

an inner vessel part to contain the first and the second heaters; and an outer vessel part to surround an outer surface of the inner vessel part.

2. The overheated steam oven according to claim 1, wherein the steam generating vessel provides insulation.

3. The overheated steam oven according to claim 2, wherein
a vacuum is maintained between the inner vessel part and the outer vessel part.

4. The overheated steam oven according to claim 3, further comprising a shielding material between the inner vessel part and the outer vessel part to intercept radiant heat.

5. The overheated steam oven according to claim 1, wherein the first heater is installed in the steam generating vessel to be immersed in the water contained in the steam generating vessel, and the second heater is mounted to the upper portion of the steam generating vessel to overheat the steam generated by the first heater, and the first heater and the second heater each has a spiral shape.

6. The overheated steam oven according to claim 1, wherein the first heater and the second heater are supported by a lower plate which closes a lower end of the steam generating vessel.

7. The overheated steam oven according to claim 1, further comprising a feed pipe and a drain pipe respectively coupled to the steam generating vessel, to feed and drain water into and from the steam generating vessel.

8. The overheated steam oven according to claim 1, further comprising a water level sensor installed in the steam generating vessel, to monitor a level of the water contained in the steam generating vessel.

9. The overheated steam oven according to claim 1, further comprising a steam inlet part provided on the rear wall of the cooling cavity, wherein the steam generating vessel comprises a bent part, which is formed by bending an upper end of the steam generating vessel toward a rear wall of the cooking cavity, the bent part being connected at a front end thereof to the steam inlet port.

10. The overheated steam oven according to claim 1, further comprising an exhaust path, provided at an upper portion in the cooking cavity, to discharge the steam from the cooking cavity to an outside of the cooking cavity.

11. The overheated steam oven according to claim 1, further comprising each of walls of the cooking cavity comprising a multi-layered panel that comprises a plurality of sheets spaced apart from each other to insulate the cooking cavity.

12. An overheated steam oven, including a cabinet to define a cooking cavity therein, and an overheated steam generator to supply overheated steam into the cooking cavity, the overheated steam generator comprising:
a steam generating vessel having upper and lower ends, through which an outlet communicates with the cooking cavity, and containing a predetermined amount of water therein;
a first heater installed under the lower end of the steam generating vessel to boil the water contained in the steam generating vessel, thus generating steam; and
a second heater mounted to the upper portion in the steam generating vessel, to overheat steam generated by the first heater wherein the steam generating vessel comprises:
an inner vessel part to contain the first and the second heaters; and
an outer vessel part to surround an outer surface of the inner vessel part.

13. The overheated steam oven according to claim 12, wherein the steam generating vessel provides insulation.

14. The overheated steam oven according to claim 13, wherein
a vacuum is maintained between the inner vessel part and the outer vessel part.

15. The overheated steam oven according to claim 14, further comprising a shielding material between the inner vessel part and the outer vessel parts to intercept radiant heat.

16. The overheated steam oven according to claim 12, wherein the first heater is supported by a lower plate which closes the lower end of the steam generating vessel, and the second heater, in the upper portion of the steam generating vessel, has a spiral shape and is supported at a terminal thereof by the lower plate.

17. The overheated steam oven according to claim 12, further comprising a feed pipe and a drain pipe respectively coupled to the steam generating vessel to feed and drain water into and from the steam generating vessel.

18. The overheated steam oven according to claim 12, further comprising a water level sensor installed in the steam generating vessel to monitor a level of the water contained in the steam generating vessel.

19. The overheated steam oven according to claim 12, further comprising a steam inlet part provided on the rear wall of the cooling cavity, wherein the steam generating vessel comprises a bent part, which is formed by bending an upper end of the steam generating vessel toward a rear wall of the cooking cavity, the bent part being connected at a front end thereof to the steam inlet port.

20. The overheated steam oven according to claim 12, further comprising an exhaust path, provided at an upper portion in the cooking cavity, to discharge the steam from the cooking cavity to an outside of the cooking cavity.

21. The overheated steam oven according to claim 12, wherein each of walls of the cooking cavity comprises a multi-layered panel that comprises a plurality of sheets spaced apart from each other to insulate the cooking cavity.

22. An overheated steam oven, having a cabinet to define a cooking cavity therein and an overheated steam generator to supply overheated steam into the cooking cavity, comprising:
a steam generating vessel including an inner vessel part and an outer vessel part to surround an outer surface of the inner vessel part, the steam generating vessel having a lower end and an upper portion and containing a predetermined amount of water therein;
an outlet, connected to the steam generating vessel, to communicate with the cooking cavity; and
first and second heaters, contained within the inner vessel part, to produce steam from the water contained in the steam generating vessel, and to overheat the produced steam, respectively, wherein
the production of steam from the water takes place under the lower end of the steam generating vessel, and
the overheating of the produced steam takes place in the upper portion of the steam generating vessel.

* * * * *

UNITED STATES PATENT AND TRADEMARK OFFICE
CERTIFICATE OF CORRECTION

PATENT NO. : 6,911,626 B2
DATED : June 28, 2005
INVENTOR(S) : Kobayashi Shozo

It is certified that error appears in the above-identified patent and that said Letters Patent is hereby corrected as shown below:

Column 7,
Line 33, change "cooling" to -- cooking --;

Column 8,
Line 11, change "parts" to -- part --;
Line 29, change "cooling" to -- cooking --.

Signed and Sealed this

Eleventh Day of April, 2006

JON W. DUDAS
*Director of the United States Patent and Trademark Office*